United States Patent
Asgeirsson et al.

(10) Patent No.: US 8,185,564 B1
(45) Date of Patent: *May 22, 2012

(54) REDIRECTION OF EMBEDDED CONTENT

(75) Inventors: Sigurdur Asgeirsson, Beaconsfield (CA); Tomas Gunnarsson, Montreal (CA)

(73) Assignee: Google Inc., Mountain View, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/562,368

(22) Filed: Nov. 21, 2006

(51) Int. Cl.
*G06F 7/00* (2006.01)
*G06F 17/30* (2006.01)
*G06F 12/00* (2006.01)

(52) U.S. Cl. .................. 707/809; 707/821; 707/803

(58) Field of Classification Search .............. 707/3, 102, 707/790, 802, 803, 809, 821
See application file for complete search history.

(56) References Cited

U.S. PATENT DOCUMENTS

| | | | |
|---|---|---|---|
| 5,805,787 A * | 9/1998 | Brant et al. ................ 714/6 |
| 2002/0107835 A1* | 8/2002 | Coram et al. ................ 707/1 |
| 2004/0133544 A1* | 7/2004 | Kiessig et al. ................ 707/1 |
| 2004/0205083 A1* | 10/2004 | Andrews ................ 707/102 |
| 2005/0289109 A1* | 12/2005 | Arrouye et al. ................ 707/1 |
| 2006/0106860 A1* | 5/2006 | Dee et al. ................ 707/102 |
| 2007/0143267 A1* | 6/2007 | Ando et al. ................ 707/3 |
| 2007/0156778 A1* | 7/2007 | Archer et al. ................ 707/201 |

OTHER PUBLICATIONS

Developer.Apple.com, "Working with Spotlight" Jun. 1, 2005, (indexed by archive.org Feb. 7, 2006), Apple, Inc. (via archive.org <http://web.archive.org/web/20060207232229/http://developer.apple.com/macosx/spotlight.html>), p. 1-8.*
OpenDarwin.org, "Chapter 2. Administration" Dec. 14, 2005 (indexed by archive.org), OpenDarwin.org (via archive.org <http://web.archive.org/web/20051214103327/www.opendarwin.org/en/faq/ch02.html>), p. 1-7.*
Singh, Amit, "Mac OS X Internals: A Systems Approach" Jun. 19, 2006, Addison Wesley Professional (via safari books online <http://proquest.safaribooksonline.com/0321278542>), p. 1-3 and 1-7.*

(Continued)

*Primary Examiner* — Brent Stace
(74) *Attorney, Agent, or Firm* — Fish & Richardson P.C.

(57) ABSTRACT

A method for extracting content from a data store includes creating a file identifier mapped to an item. The method includes receiving a request that seeks cached access to the item and that is not directed to the item. In response to the request, contents of the item are provided using the file identifier without caching the contents. A system for extracting content from a data store includes an indexer. The system includes a data store containing at least an item. The system includes a redirector containing a file identifier mapped to the item. When the redirector receives a request originated by the indexer that seeks cached access to the item and that is not directed to the item in the data store the redirector provides contents of the item using the file identifier without caching the contents in the system.

24 Claims, 5 Drawing Sheets

OTHER PUBLICATIONS

IBM, "Scheme to Bypass Cache for Big, One Time Reads" Nov. 1, 1993, IBM Technical Disclosure Bulletin, Issue 11, vol. 36, p. 335-336 (reprinted as pp. 1-4).*

IBM, "Scheme to Bypass Cache for Big, One-Time Writes" Nov. 1, 1993, IBM Technical Disclosure Bulletin, Issue 11, vol. 36, p. 273-274 (reprinted as pp. 1-4).*

"Windows Networking API/Redirector Structures" [online]. Microsoft Corporation Apr. 10, 2004, [retrieved on Oct. 17, 2006]. Retrieved from the Internet: <URL: http://msdn.microsoft.com/library/en-us/wceredir/html/ceconwindowsnetworkingapiredirectorstructures.asp?frame=true>.

"About Cache Manager in Windows Server 2003" [online]. Microsoft Corporation Apr. 29, 2004, [retrieved on Oct. 2, 2006]. Retrieved from the Internet: <URL: http://support.microsoft.com/?kbid=837331>.

"Fuse" [online]. CSWL Inc. Nov. 30, 2005, [retrieved on Nov. 21, 2006]. Retrieved from the Internet: <URL: http://wiki.tcl.tk/13853>.

"Notes and Tags" [online]. Yahoo! Company May 11, 2005, [retrieved on Nov. 10, 2006]. Retrieved from the Internet: http://web.archive.org/web/20051105104022/http://www.flickr.com/learn_more_3.gne.

"Create: Enjoy your pictures in fun, creative ways—it's what photography's all about!" [online]. Google, Inc. 2005, [retrieved on Oct. 2, 2006]. Retrieved from the Internet: <URL: http://picasa.google.com/features/features-create.html>.

"Backup: Don't lose your digital memories. Safely back up your photos with Picasa" [online]. Google, Inc. 2005, [retrieved on Oct. 2, 2006]. Retrieved from the Internet: <URL: http://picasa.google.com/features/features-backup.html>.

"Prints & Products: Print beautiful pictures at home with more custom sizes or order prints, gifts and books from your favorite online companies" [online]. Google, Inc. 2005, [retrieved on Oct. 2, 2006]. Retrieved from the Internet: <URL: http://picasa.google.com/features/features-print.html>.

"Share: The hardest part of sharing your pictures is choosing your favorites" [online]. Google, Inc. 2005, [Retrieved on Oct. 2, 2006]. Retrieved from the Internet: <URL: http://picasa.google.com/features/features-share.html>.

"Edit: Turn a gray sky into a picture-perfect day" [online]. Google, Inc. 2005, [Retrieved on Oct. 2, 2006]. Retrieved from the Internet: <URL: http://picasa.google.com/features/features-edit.html>.

"Organize: Picasa instantly locates and organizes all the pictures on your computer" [online]. Google, Inc. 2005, [Retrieved on Oct. 2, 2006]. Retrieved from the Internet: <URL: http://picasa.google.com/features/index html>.

"Translucent Databases" [online]. Infostrada Communications, LLC, Dec. 15, 2003; [retrieved on Nov. 21, 2006]. Retrieved from the Internet: <URL: http://www.linux-mag.com/index.php?option=com_content&task+view&id=1514&Itemi...>.

"doc.sun.com: man pages section 7: Device and Network Interfaces" [online]. Sun Microsystems, Inc., Apr. 10, 2001; [Retrieved on Nov. 21, 2006]. Retrieved from the Internet: <URL: http://docs.sun.com/app/docs/doc/816-0222/6m6nmlt06?a=view>.

"Using WebDAV with IIS" [online]. TechGenix Ltd., Feb. 3, 2005; [retrieved on Nov. 21, 2006]. Retrieved from the internet: <URL: http://www.windowsnetworking.com/articles_tutorials/WebDAV-IIS.html>.

"Microsoft Windows Vista Build 5231 (Community Technical Preview 2) Review" [online]. Penton Media, Inc. Oct. 18, 2005, [retrieved on Nov. 21, 2006]. Retrieved from the Internet: <URL: http://www.winsupersite.com/reviews/winvista_5231.asp>.

"Windows 95/98/ME and large amounts of memory" [online]. Virtualdub.org May 18, 2005, [retrieved on Nov. 21, 2006]. Retrieved from the Internet: <URL: http://www.virtualdub.org/blog/pivot/entry.php?id=37>.

"Network and Communications" [online]. CSWL Inc. 1999, [retrieved on Nov. 21, 2006]. Retrieved from the Internet: <URL: http://www.cswl.com/whitepapers/filter-driver.html>.

* cited by examiner

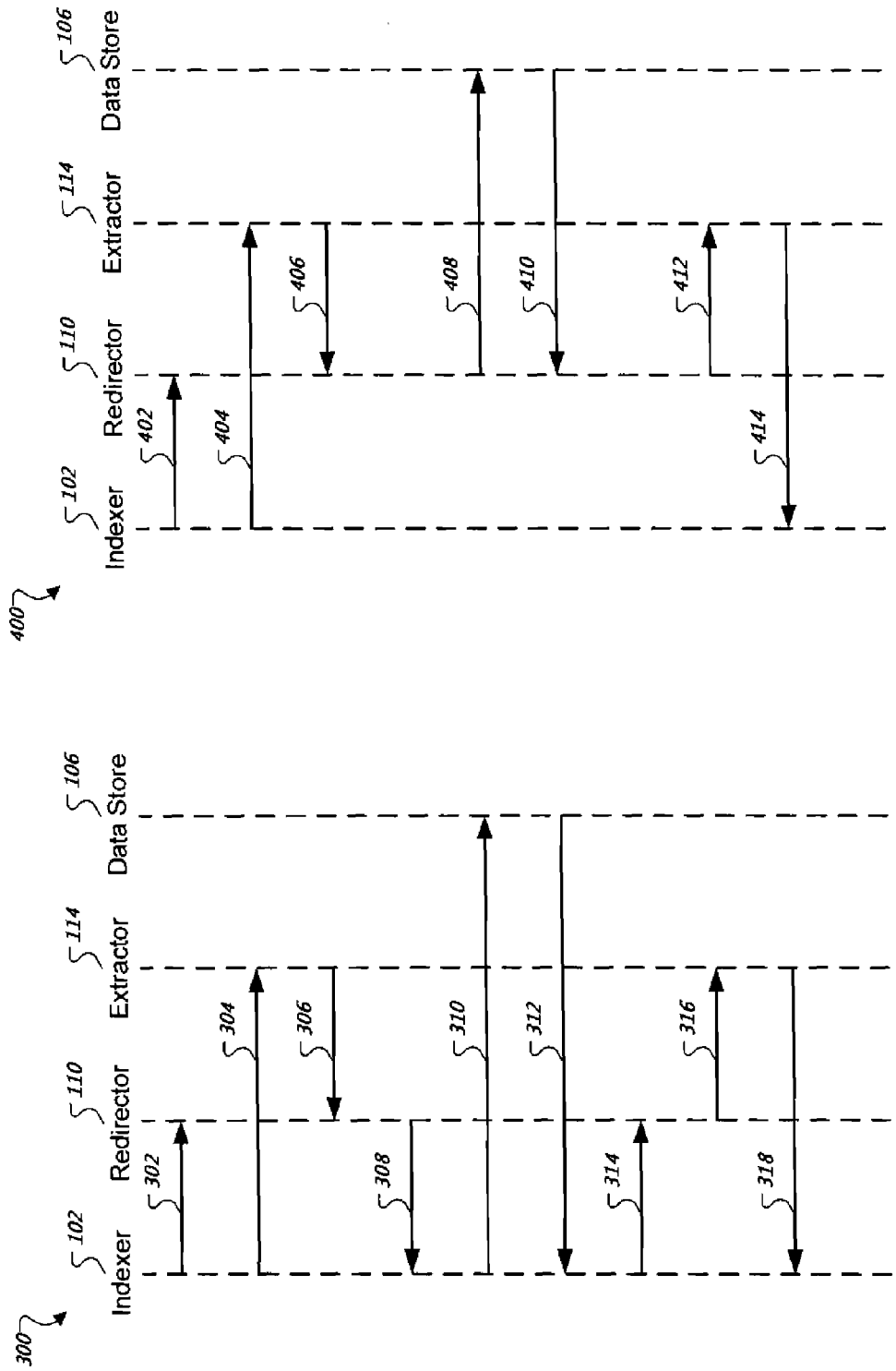

REDIRECTION OF EMBEDDED CONTENT

TECHNICAL FIELD

This document relates to data retrieval.

BACKGROUND

Many computer systems place data volumes in one or more data stores. The storage may be intended for short or long periods, but it can happen that one or more portions of information must be extracted from time to time. Extraction can, for example, be required for purposes of indexing, because an indexing application being executed in the system may need the information extracted before the indexing can be performed. Such indexing (and associated extraction) can be performed on the textual contents of the data store(s) and also on metadata that may be included in any of the items.

The extraction of item content can in conventional systems involve the creation of a temporary file for the content. Such a temporary file can then be placed on a disk in the system. While it is on the disk, the temporary file may be subject to inadvertent indexing by another routine, or subject to unauthorized access. Generally, the presence of the temporary file on the disk consumes some amount of system resource and may affect performance. In some situations, the resource consumption may be considered a significant factor, for example where only a fraction of the content is used in the indexing.

The access to content in a data store can sometimes affect the cache memory in the system. Particularly, if a relatively large amount of data that is retrieved is made to pass through the cache memory, this can result in other data being evicted from the cache. This can also cause the cache to grow at the cost of other system memory, and so evict code and data from system memory.

SUMMARY

In a first general aspect, a computer-implemented method for extracting content from a data store includes creating a file identifier mapped to an item. The method includes receiving a request that seeks cached access to the item and that is not directed to the item. In response to the request, contents of the item are provided using the file identifier without caching the contents.

Implementations can include any, all or none of the following features. The method can further include presenting semantics compatible with a cached access while providing the contents. The presented semantics can include that at least one of a read or write operation with an arbitrary starting byte offset is allowed. The presented semantics can include that at least one of a read or write operation with an arbitrary size is allowed. The presented semantics can include that the request is not restricted to be sector aligned in a starting byte offset or in size. The request can be generated for indexing of the contents. The method can further include presenting a virtual file system including at least the file identifier. The method can further include generating a prompt to seek the access to the file identifier, and the contents can be provided in response to the prompt. The method can further include providing at least part of the contents to perform the indexing.

In a second general aspect, a system for extracting content from a data store includes an indexer. The system includes a data store containing at least an item. The system includes a redirector containing a file identifier mapped to the item. When the redirector receives a request originated by the indexer that seeks cached access to the item and that is not directed to the item in the data store the redirector provides contents of the item using the file identifier without caching the contents in the system.

Implementations can include any, all or none of the following features. The redirector can include a kernel-mode driver in the system. The kernel-mode driver can terminate in a user-land application program interface available at least to the indexer. The redirector can include a dynamic link library hosting an object that provides the user-land application program interface. The redirector can include a system-account service configured to start and stop the redirector. The redirector can include a server presenting to the extractor a virtual file system that includes at least the file identifier.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 3 is a flow diagram of exemplary operations for extracting content from a data store without writing to a temporary file.

FIG. 4 is a flow diagram of exemplary operations for extracting content from a data store without using the cache.

Like reference symbols in the various drawings indicate like elements.

DETAILED DESCRIPTION

Figure 1:
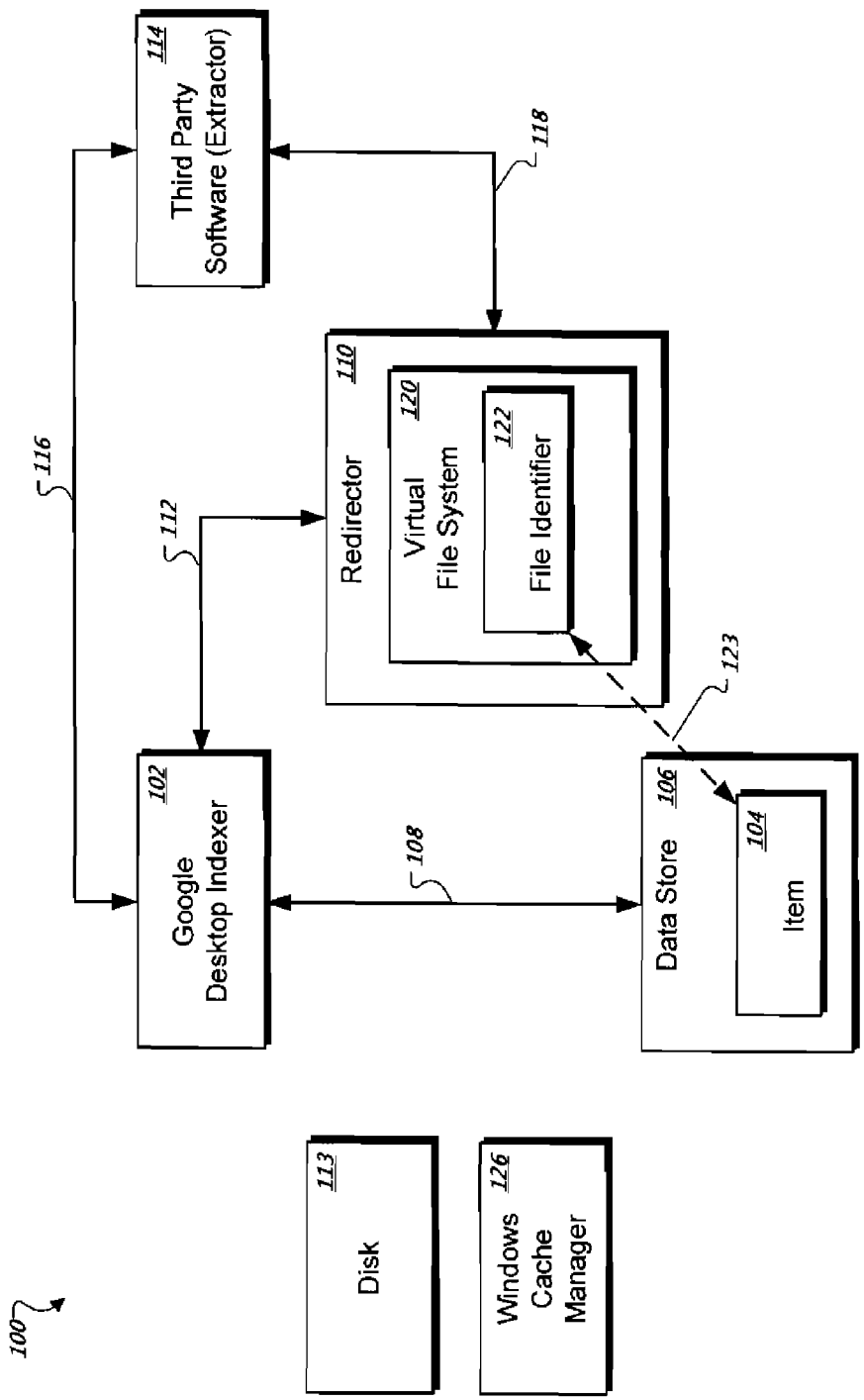
FIG. 1 is an exemplary system that can manage, manipulate and store data for one or more purposes and, in particular, can extract content from a data store without writing to a temporary file.

FIG. 1 is an exemplary system 100 that can manage, manipulate and store data for one or more purposes and, in particular, can extract content from a data store without writing to a temporary file. In one implementation, the contents are extracted for an indexing process. The indexing of the content can be performed by an indexer 102, such as the Google Desktop indexer. As will be discussed below, the indexer 102 can have a role in the extraction process. For instance, the content can be an item 104 within a data store 106, such as a word processing document embedded within an email message. Other types of content that can be extracted by system 100 without writing to a temporary file can include, for example, spreadsheets, instant messages, web pages, and files in archives. System 100 can also extract non-embedded content without writing to a temporary file.

The system 100 includes a redirector 110. The redirector 110 can be logically attached to, and can be coupled with, the indexer 102, as indicated by arrow 112. In another implementation, the redirector 110 can be implemented in the indexer 102. The system 100 can use the redirector 110 for redirecting a request for extraction of content when, for example, the resident extractor of the indexer 102 (or any third party extractor it may employ) encounters content (e.g., embedded content) that the extractor is not configured to handle. For instance, the system 100 can use the redirector 110 if the extractor, during extraction for indexing purposes, encounters content such as the embedded item 104 in the data store 106 that cannot be extracted (e.g., because of the API or the file format). Particularly, the redirector 110 can facilitate the extraction of content without writing the content item to a temporary file, such as a disk 113.

The system 100 can include an extractor (e.g., third party extractor software) 114. The extractor 114 can include, for example, one or more applications (e.g., third party software) that are configured to extract textual contents and metadata from various file types such as email messages, word processing documents, spreadsheets, instant messages, web pages, and files in archives, to name a few examples. In a sense, the extractor 114 can represent the collection of third party applications configured to extract content of various formats that the indexer 102 can index. The indexer 102 can invoke the extractor 114 (as indicated by arrow 116).

In some implementations, the extractor 114 can use one or more Portable Document Format (PDF)-to-text converters, such as the Linux/Unix command pdftotext, for extracting PDF documents. In other implementations, the extractor 114 can use one or more document-based filters, such as the Microsoft Office Document Filter, for extracting content from documents such as word processing documents, spreadsheets, and presentation applications. In yet other implementations, the extractor 114 can use one or more other interfaces, such as Windows Shell programmatic interfaces, for extracting metadata (e.g., document authors, titles, etc.).

The extractor 114 can be logically attached to the redirector 110, as indicated by arrow 118. During the extraction process, information can flow among the indexer 102, the extractor 114, and the redirector 110, as indicated by the arrows 112, 116 and 118. Such information can include requests and responses, extracted content, and metadata corresponding to the extracted content. A more detailed exemplary description of the interactions among the indexer 102, the extractor 114, and the redirector 110 is included below in reference to FIG. 2.

To facilitate file identification for the extraction by the extractor 114, the redirector 110 can maintain a file system (e.g., a virtual file system) 120. The file system 120 can keep track of and provide access to the files within the system 100 that are to be extracted and indexed. For example, the file system 120 can provide access to items 104 in data stores 106 that are extracted by the extractor 114. This access can be independent of the underlying physical file structures of the items 104 and the data stores 106.

The file system 120 can provide similar access to the indexer 102 so that it can access items 104 in data stores 106 for indexing purposes as indicated by arrow 108.

The file system 120 can include one or more file identifiers 122. Such identifiers 122 can serve to represent (e.g., virtually) the collection of files that can be extracted and indexed in the system 100. For example, the indexer 102 generates the file identifier 122, e.g., a unique file name, for the item 104. Here, the file identifier 122 is mapped one-to-one to the associated physical item 104, as indicated by dashed arrow 123. If there are several file identifiers in the file system 120, each can have a corresponding mapping 123. The mappings 123 can facilitate extraction of content within the system 100 that relies on the use of the redirector 110. For example, the extractor 114, when extracting content from the item 104, can access the file (e.g., a word processing document attachment embedded in an email message) virtually via its corresponding file identifier 122.

The system 100 can also be used to extract and index non-embedded content. For example, the item 104, such as a text file, can be a file that is not embedded within a data store 106. In this case, the indexer 102 can direct the extractor 114 to open the file directly to extract information used for indexing purposes. Thus, the extractor 114 can provide extracted content to the indexer 102 for indexing, and this content can include information that was obtained from an embedded item, and contents from a non-embedded item.

The system 100 can also be configured to extract content from a data store without dragging the content through a cache. For example, when extracting content from the item 104, the indexer 102 and the redirector 110 can access the item 104 directly, bypassing the cache 126. Particularly, bypassing can be accomplished while providing semantics to the entity requesting the information that are compatible with a cached access. For example, while the software interface of the access to item 104 can remain unchanged, the low-level (e.g., kernel-mode) implementation can bypass the logic that writes intermediately to the cache. In some implementations, the cache bypass can be implemented by invoking RxIndicate ChangeOfBufferingState, or a similar procedure for changing the buffering state, in order, for example, to disable all "local" read/write caching. In other implementations, the cache bypass can be implemented by changing the internal software logic of the redirector 110, such as at the kernel-mode, to include a modified caching implementation that bypasses the system-wide caching implementation, and so does not contribute to system cache growth and the subsequent eviction of other needed data. Providing non-cached input/output can have the advantage of improved system performance by avoiding cache manager poisoning. Such poisoning can occur, for example, when the indexer drags large amounts of data through the cache manager, evicting other data, such as executable images and data of other programs that are running.

Figure 2:
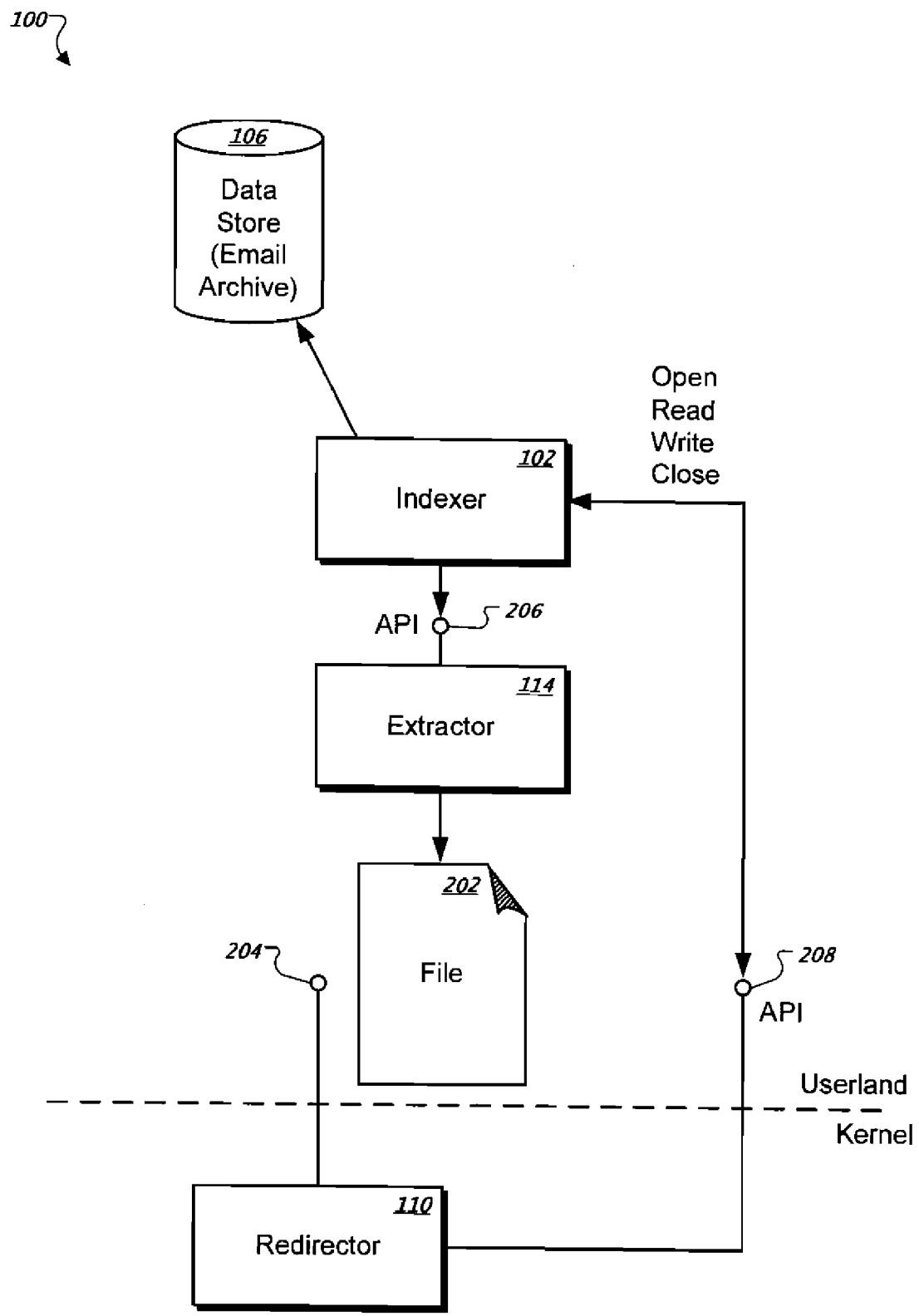
FIG. 2 is another depiction of the exemplary system which extracts content from the data store using application program interfaces (APIs) of the extractor and the redirector.

FIG. 2 is another depiction of the exemplary system 100 which extracts content from the data store 106 using application program interfaces (APIs) of the extractor 114 and the redirector 110. As compared to FIG. 1, which depicts the system 100 at a higher, conceptual level, FIG. 2 illustrates the distribution of responsibility between kernel-mode components and user-land components in this example. In particular, FIG. 2 depicts the use of APIs of the redirector 110 and the extractor 114. The description that follows identifies the exemplary interactions that can occur when, for example, the indexer 102 prepares for and extracts embedded content from the data store 106 as indicated by arrow 108.

Before or when it is time to index, the indexer 102 can determine that the data store 106 contains embedded content. In particular, the embedded content can have a content type that the API of the indexer 102 is not configured to extract. For example, the embedded content can be a word processing document (e.g., included in zip archive) that the extractor 114 cannot read.

In order to extract the sought contents, the indexer 102 can create a unique name for the embedded content in the namespace of the redirector 110. To complete this operation, the indexer 102 can first invoke the redirector 110 using the redirector's API 208, passing it the name of the data store 106 and the unique name for the content. The redirector 110 can store the unique name for this file, for example in the file system 120 (FIG. 1). This can provide the extractor 114 access (e.g., virtual access) to the item 104, which in this example is a file 202. The file 202 is here shown outside the data store to illustrate that to the extractor the file can appear as located in a virtual file system generated by the redirector.

The indexer 102 can request the extractor 114 to extract the content of the file. The request can occur, for example, using the extractor's API 206. In general, this type of request can be for embedded content or for non-embedded content. For example, if the request is to extract embedded content, such as the word processing document embedded in an archive, the extractor 114 can be requested to extract the document. In another example, if the request is to extract non-embedded content, such as a single specific file, the extractor 114 can be requested to extract the single specific file. In either case, the request can be to extract the metadata and/or contents of the document or file. Having received the extraction request from the indexer 102, the extractor 114 can request the file 104 from the file system 120 of the redirector 110. The extractor 114 can receive the file 104 from the redirector 110 using the redirector's API 204.

After the extractor 114 requests the file 104 from the redirector 110, the redirector 110 can notify the indexer 102. The notification of the content extraction request can occur using the API 208 of the redirector 110. The requested content can be, for example, the word processing document that is embedded in the data store 106.

Once the redirector 110 has completed its redirection of the extraction request, the indexer 102 can retrieve the contents of the embedded file. For example, the indexer 102 can extract the contents of the word processing document that is embedded in the data store 106. This extraction process can occur on a byte-by-byte basis, or on a block-by-block basis, such as in a generic read system call that can use a starting index and a length.

After the content has been extracted, such as from an embedded or non-embedded file, the indexer 102 can forward the extracted content (e.g., for receipt by the third party software that forms the extractor 114). The operation of forwarding the content can use the extractor's API 206 and the redirector's API 208.

The extractor 114 can accumulate the extracted content received from the indexer 102, and optionally combine the extracted content with other textual content or metadata extracted earlier. For example, content that the indexer 102 extracted from the word processing document for indexing purposes can be accumulated with earlier-extracted textual content and metadata, such as words or phrases in the document and the document's attributes. While the extraction is taking place, the extractor 114 can, for example, keep partially extracted content in memory, and may optionally return partial extracts to the indexer 102 through the extractor's API 206.

Using the extracted content provided by the extractor 114, the indexer 102 can index the content. The indexing can occur on extracted embedded content as well as extracted non-embedded content. For example, the indexer 102 can index embedded content (e.g., the word processing document) extracted in an operation involving the redirector 110, as well as non-embedded content extracted directly (e.g., without redirection) by the extractor 114.

FIG. 3 is a flow diagram of exemplary operations 300 for extracting content from a data store, such as within the system 100, without writing to a temporary file. Processing can begin in step 302 when a file identifier is generated. For example, the redirector 110 can create the file identifier and map it to an item in a data store that is to be extracted by an extractor for indexing by an indexer. For example, the indexer 102 can provide the file identifier 122 to the redirector 110. The file identifier 122 can be mapped to the item 104 that is embedded in the data store 106. The determination that the redirector 110 is to be used to aid in the extraction process can occur, for example, if the resident extractor of the indexer 102 is not configured to extract the contents of the data store 106.

In another implementation, the indexer 102 need not notify the redirector 110 of the existence of a virtual file identifier 122 before requesting that it be opened. For example, when the extractor 114 attempts of access the file, the indexer 102 can be notified and handed back the identifier (e.g., a path or file name) that was passed to the extractor 114 (cf. step 304).

In step 304, the content can be accessed using the file identifier. For example, the indexer 102 can provide the file identifier 122 to the extractor 114. Selection of the particular third party software that can perform the extraction and thus form the extractor 114 can be based on metadata, associated with the file identifier 122 that can aid in identifying the type of content to be extracted. For example, if the file identifier 122 maps to a word processing document, the extractor 114 can use third party software that extracts that type of word processing document content. By providing the file identifier 122 to the extractor 114, the indexer 102 is directing the extractor 114 to extract the contents of the item 104 mapped to by the file identifier 122.

In step 306, the file identifier (i.e., identifying the file to be extracted) is requested. For example, the extractor 114 can make a request to the redirector 110 to open the name of the file from which content is to be extracted. In particular, the file name can be the file identifier 122 that is mapped to the item 104 which contains the content to be extracted. Such a file identifier 122 can be included in the file system 120.

In step 308, notification is made to provide the content. For example, the notification can be made using the API of the redirector. For instance, the redirector 110, using its API 208, can notify the indexer 102 to extract the embedded content detected in step 302.

In step 310, extraction begins (e.g., the indexer 102 can access the data store 106 to begin extraction). For example, the extraction can complete in step 312, when, for example, the indexer 102 retrieves the remaining contents of the data store 106. Such extraction can occur on a byte-by-byte and/or a block-by-block basis, without extracting the content to a temporary file. For example, the indexer 102 can extract the item 104 without having to write to the disk 113. Redirecting without using temporary files can provide the advantage of improved system efficiency by avoiding the corresponding extra processing and disk input/output that temporary files use.

In step 314, the extracted content is stored. For example, the indexer 102 can provide the content extracted in step 310 to the redirector 110 for storage.

In step 316, the contents of the item are provided. For example, the redirector 110 can provide the third party software that forms the extractor 114 with the contents of the word processing document extracted in step 312. The content can be combined with other content previously received by the extractor 114, such as textual content or metadata extracted at other times.

In step 318, all or some of the extracted contents are provided. For example, the extractor 114 can provide some or all of the content extracted from the item 104 to the indexer 102. The extractor 114 can also provide other extracted content, such as textual content or metadata extracted at other times. Upon receipt of the contents, the indexer 102 can perform indexing based on those contents.

FIG. 4 is a flow diagram of exemplary operations 400 for extracting content from a data store, such as within the system 100, without using the cache. For example, referring to in FIG. 1, the system 100 can extract and index the item 104, such as a word processing document, without using the cache 126. Processing can begin in step 402 when a file identifier for a file from which content is to be extracted for indexing purposes is generated. For example the redirector 110 can create the file identifier and map it to an item in a data store that is to be extracted by an extractor for indexing by an indexer. For instance, the indexer 102 can provide the file identifier 122 to the redirector 110. The file identifier 122 can be mapped to the item 104 that is embedded in the data store 106.

In step 404, an access request is initiated. For example, the indexer 102 can provide the file identifier 122 to the extractor 114, directing the extractor 114 to seek access to the file. Selection of the third party software that can form the extractor 114 can be based on metadata, associated with the file identifier 122 that can aid in identifying the type of content to be extracted. By providing the file identifier 122 to the extractor 114, the indexer 102 is directing the extractor 114 to extract the contents of the item 104 mapped to by the file identifier 122. In another implementation, the extractor is not used and, instead, the indexer is the component that requests the item content from the redirector.

In step 406, access to the file identifier is requested. For example, the extractor 114 can make a request to the redirector 110 to open the name of the file from which content is to be extracted. In particular, the file name can be the file identifier 122 that is mapped to the item 104 which contains the content to be extracted. Such a file identifier 122 can be included in the virtual file system 120. In an implementation that does not use the extractor, the indexer can send the request 406.

In step 408, extraction begins. The extraction occurs in step 410, when the redirector retrieves the contents of the data store. Such extraction can occur on a byte-by-byte and/or a block-by-block basis, without using the cache. For example, the redirector 110 can extract the item 104 without having to use the cache 126. Redirecting without using cache can provide the advantage of improved system efficiency by avoiding unnecessary cache poisoning.

The contents are stored in step 412. For example, the redirector 110 can provide the extractor 114 with the contents of the word processing document extracted in step 410. The content can be combined with other content previously received by the extractor 114, such as textual content or metadata extracted at other times.

In one implementation, the redirector extracts the contents without caching them. Moreover, the redirector can present semantics compatible with cached file access while doing so. That is, the redirector can behave in one or more respects as if it were performing cached access to the contents, for example, as will be described below. This can provide an advantage in the interaction with the indexer and other components, because they may be configured to interact according to a protocol that assumes that caching takes place.

The presentation of semantics compatible with cached access can include the operations that the redirector make available for the other entities, such as the extractor, that interact with it. This can relate to the reading or writing of data into the data store.

For example, the redirector can be configured so that it allows a read or write operation to be performed with an arbitrary starting byte offset. As another example, the redirector can be configured to allow the read or write operation to have an arbitrary size. As another example, the redirector can be configured to not restrict the request to be sector aligned in a starting byte offset or in size.

In step 414, the contents extracted from the data store are provided. For example, the extractor 114 can provide some or all of the contents extracted from the item 104 to the indexer 102. The extractor 114 can also provide other extracted content, such as content having different content types. Upon receipt of the contents, the indexer 102 can perform indexing based on those contents.

Figure 5:
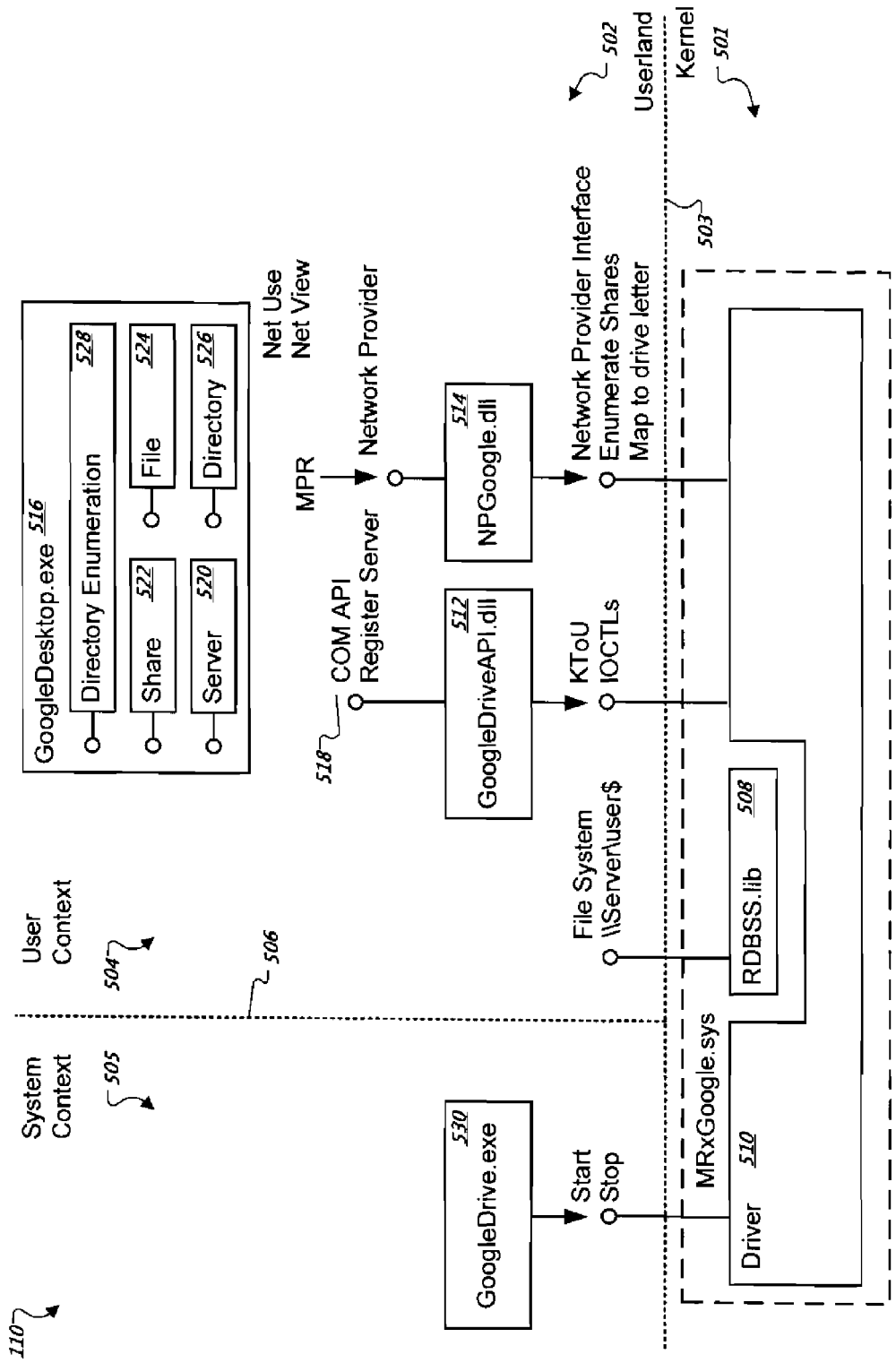
FIG. 5 is a schematic diagram depicting an exemplary implementation of the redirector.

FIG. 5 is a schematic diagram depicting an exemplary implementation of the redirector 110. In particular, FIG. 5 shows more details regarding how the redirector 110 can interact with the indexer 102, the extractor 114 and data store 106 of FIGS. 1-4.

The components of the redirector 110 can be divided logically into a kernel area 501 and a user-land area 502, as indicated by dotted line 503. For example, the types of redirector 110 components in the kernel area 501 can include processes that execute in the kernel area of operating system for purposes of efficiency. The remaining components of the redirector 110 function in the user-land area 502. These components can include components that execute outside of the kernel, optionally in connection with system programs and third party applications. In some implementations, a given component can have one or more sub-components that execute in the kernel area 501, while other sub-components execute in the user-land area 502.

The user-land area 502 can further be divided logically into a user context area 504 and system context area 505, as indicated by dotted line 506. The types of redirector 110 components present in the user context area 504 can include third party applications, such as applications that extract and index content. The types of redirector 110 components present in the system context area 505 can include system-level programs, such as those that start and stop processes within the system.

The portion of the redirector 110 in the kernel area 501 is kernel-mode application that is here labeled MRxGoogle.sys. The area 501 can include a Redirected Drive Buffering Sub-System (RDBSS) library 508 embedded in a kernel driver 510. The RDBSS.lib 508 can serve as a kernel-level shell for the redirector. In a sense, the RDBSS.lib 508 can serve as a kernel-level driver that provides services to sub-components in the kernel. The kernel driver 510 can manage integration of kernel interfaces, such as interfaces with the memory manager, cache manager, and input/output manager. The kernel driver 510 can also manage most handle-level semantics, such as per-file read/write calls and pointers, byte-range locking, and permissions, to name a few examples.

The user context area 504 of the redirector 110 includes a GoogleDriveAPI.dll 512, an NPGoogle.dll 514, and a GoogleDesktop.exe 516. The GoogleDriveAPI.dll 512 can be, for example, a DLL (dynamic link library) hosting a COM (communication) object that provides the AP1 for handling server registration requests received from the user context area 504, as well as forwarding requests such as share enumeration, file open/create, read/write, directory enumeration, etc., to the user-land service (e.g., GoogleDesktop.exe). The NPGoogle.dll 514 can provide a network provider data link library for services such as enumeration over the redirector's namespace, drive mapping, drive mappings enumeration, and such. Each of the user context area 504 components 512-516 can provide access to resources in the kernel area 501, such as those resources used by the system 100 in extraction and indexing operations as depicted in FIGS. 1-4. In a sense, the kernel-mode driver 510 can be considered to terminate in the user context area 504 where the API of the driver 510 is accessible to the GoogleDriveAPI.dll 512 and the NPGoogle.dll 514, which are in turn accessible to the indexer 102.

The GoogleDesktop.exe 516 can be a component of the user-land area 502 that registers a server object, such as one that implements IGoogleDriveServer, with the redirector COM API 518. During the registration, the redirector 110 can be associated with a server name in some namespace (e.g., \\desktop in a UNC namespace). File system operations on the namespace governed by the redirector 110 can subsequently result in calls to the server object and objects in the GoogleDesktop.exe 516. For example, the GoogleDesktop.exe 516 can contain a hierarchy of objects: a server 520, a share 522, a file 524, a directory 526, and a directory enumeration 528, which represent entities in the virtual file system presented by the redirector and/or handle operations thereon.

As an example, an instance of IGoogleDriveFile represents a file on the virtual file system, and handles operations such as Read/Write/SetAttributes, etc., whereas an instance of IGoogleDriveDirectory represents a directory on the virtual file system, and is responsible for creating an instance of IGoogleDriveDirectoryEnumeration upon request to handle directory enumeration of the virtual directory.

The system context area 505 can include a GoogleDrive.exe system service 530. The service 530 can be configured to start (and stop) the redirector 110 at system startup (and shutdown).

Figure 6:
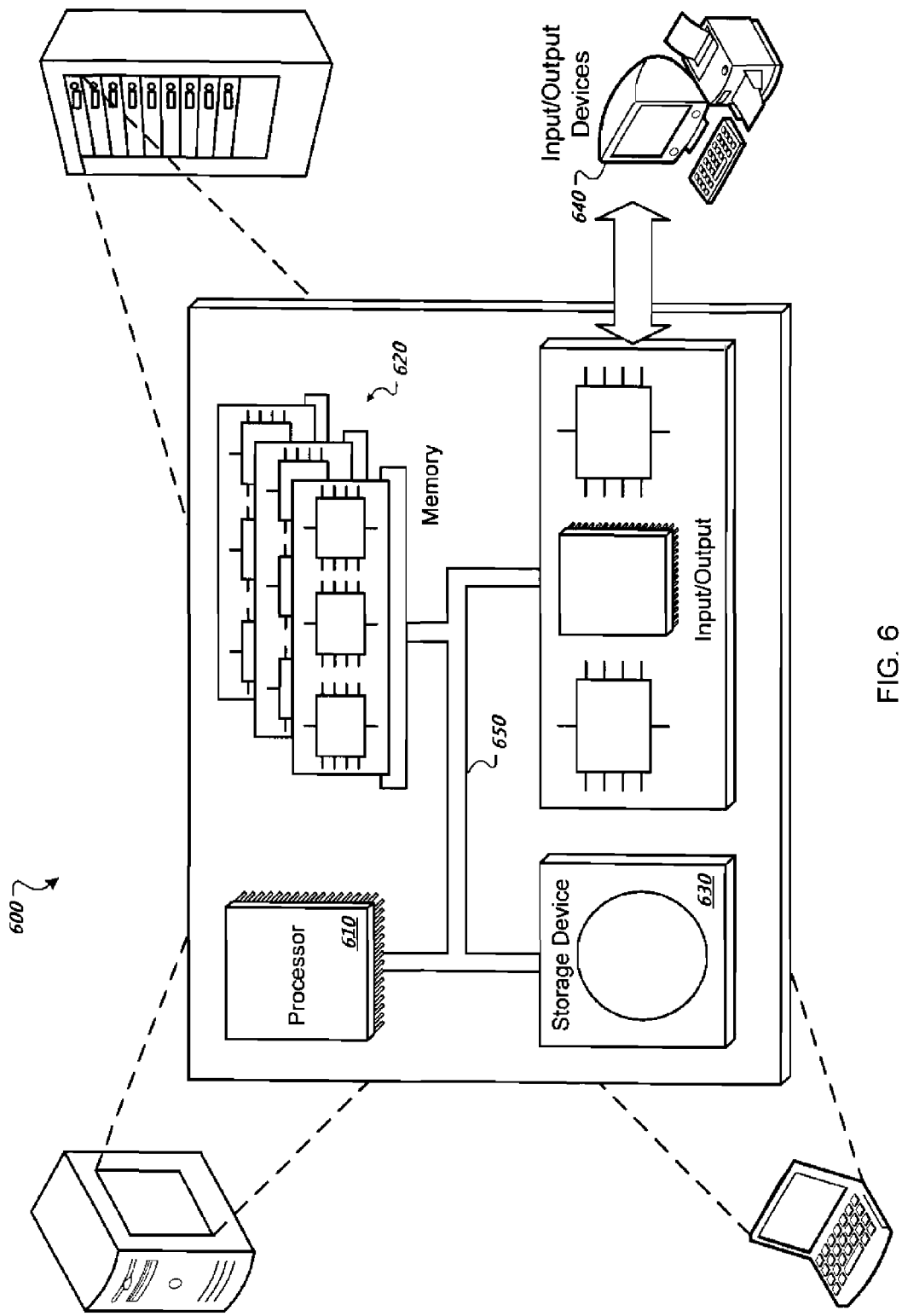
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. Accordingly, other implementations are within the scope of the following claims.

What is claimed is:

1. A computer implemented method comprising:
receiving, from an indexer application, an identifier for embedded content of a file;
receiving, from a converter application, a request for the embedded content, the request including the identifier;
in response to receiving the request, transmitting, to the indexer application, the request for the embedded content;
receiving, from the indexer application, the embedded content; and
transmitting, to the converter application, the embedded content and a request for conversion of the embedded content into indexable content.

2. The method of claim 1, further including storing the embedded content.

3. The method of claim 1, further including providing a virtual file system that stores the identifier.

4. The method of claim 1, wherein the embedded content has a content type that an application programming interface (API) of the indexer application is unable to convert.

5. The method of claim 1, wherein transmitting the request for the embedded content includes using an application programming interface (API).

6. The method of claim 1, wherein receiving and transmitting the embedded content occurs without caching the embedded content.

7. The method of claim 6, further including providing semantics compatible with a cached access of the embedded content.

8. The method of claim 1, wherein the indexer application is unable to convert the embedded content into indexable content.

9. A computer program tangibly embodied in a computer readable storage medium and comprising instructions that when executed by a processor perform a method comprising:
receiving, from an indexer application, an identifier for embedded content of a file;
receiving, from a converter application, a request for the embedded content, the request including the identifier;
in response to receiving the request, transmitting, to the indexer application, the request for the embedded content;
receiving, from the indexer application, the embedded content; and
transmitting, to the converter application, the embedded content and a request for conversion of the embedded content into indexable content.

10. The computer program product of claim 9, further comprising instructions of storing the embedded content.

11. The computer program product of claim 9, further comprising instructions of providing a virtual file system that stores the identifier.

12. The computer program product of claim 9, wherein the embedded content has a content type that an application programming interface (API) of the indexer application is unable to convert.

13. The computer program product of claim 9, wherein the instructions of transmitting the request for the embedded content includes using an application programming interface (API).

14. The computer program product of claim 9, wherein the instructions of receiving and transmitting the embedded content occurs without caching the embedded content.

15. The computer program product of claim 14, further comprising instructions of providing semantics compatible with a cached access of the embedded content.

16. The computer program product of claim 9, wherein the instructions of receiving further includes the indexer application being unable to convert the embedded content into indexable content.

17. A system comprising:
one or more processors; and
a computer readable storage medium comprising instructions that when executed by at least one of the processors perform a method comprising:
receiving, from an indexer application, an identifier for embedded content of a file;
receiving, from a converter application, a request for the embedded content, the request including the identifier;
in response to receiving the request, transmitting, to the indexer application, the request for the embedded content;
receiving, from the indexer application, the embedded content; and
transmitting, to the converter application, the embedded content and a request for conversion of the embedded content into indexable content.

18. The system of claim 17, further comprising instructions of storing the embedded content.

19. The system of claim 17, further comprising instructions of providing a virtual file system that stores the identifier.

20. The system of claim 17, wherein the embedded content has a content type that an application programming interface (API) of the indexer application is unable to convert.

21. The system of claim 17, wherein the instructions of transmitting the request for the embedded content includes using an application programming interface (API).

22. The system of claim 17, wherein the instructions of receiving and transmitting the embedded content occurs without caching the embedded content.

23. The method of claim 22, further comprising instructions of providing semantics compatible with a cached access of the embedded content.

24. The system of claim 17, wherein the instructions of receiving further includes the indexer application being unable to convert the embedded content into indexable content.

* * * * *

UNITED STATES PATENT AND TRADEMARK OFFICE
CERTIFICATE OF CORRECTION

PATENT NO. : 8,185,564 B1
APPLICATION NO. : 11/562368
DATED : May 22, 2012
INVENTOR(S) : Sigurdur Asgeirsson It is certified that error appears in the above-identified patent and that said Letters Patent is hereby corrected as shown below:

Col. 11, Line 34, in Claim 9, after "computer program" insert -- product --.

Col. 12, Line 48, in Claim 23, after "The" delete "method" and insert -- system --.

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,185,564 B1 | Page 1 of 1 |
| APPLICATION NO. | : 11/562368 | |
| DATED | : May 22, 2012 | |
| INVENTOR(S) | : Asgeirsson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 14 days.

Signed and Sealed this
Eleventh Day of September, 2012

David J. Kappos
*Director of the United States Patent and Trademark Office*